Aug. 17, 1926.
E. N. BASSETT
1,596,331
PIE TIN
Filed April 4, 1925
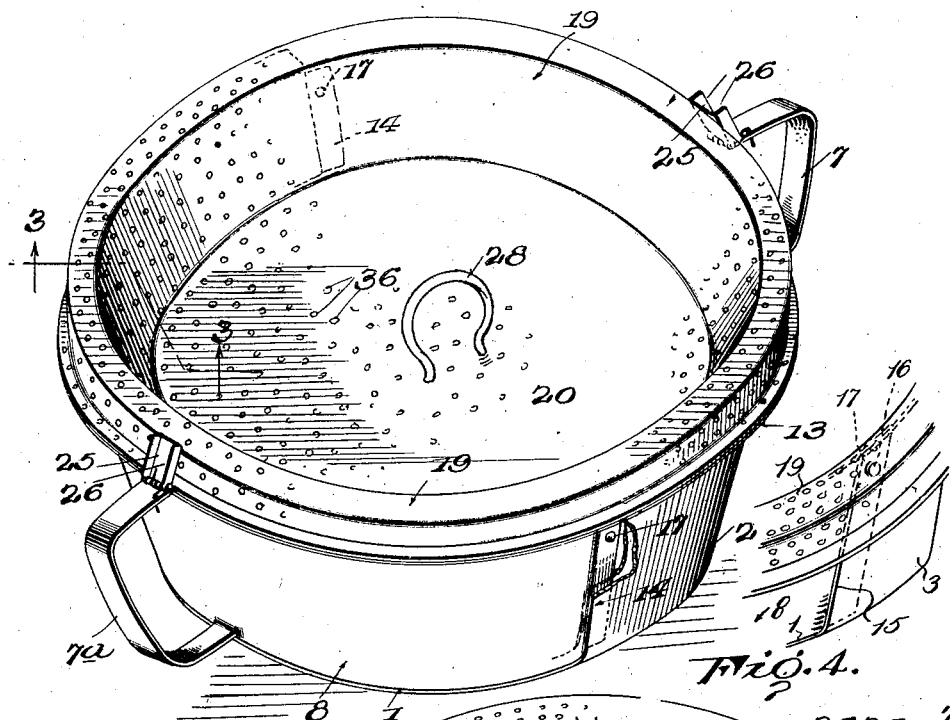
Fig. 1.
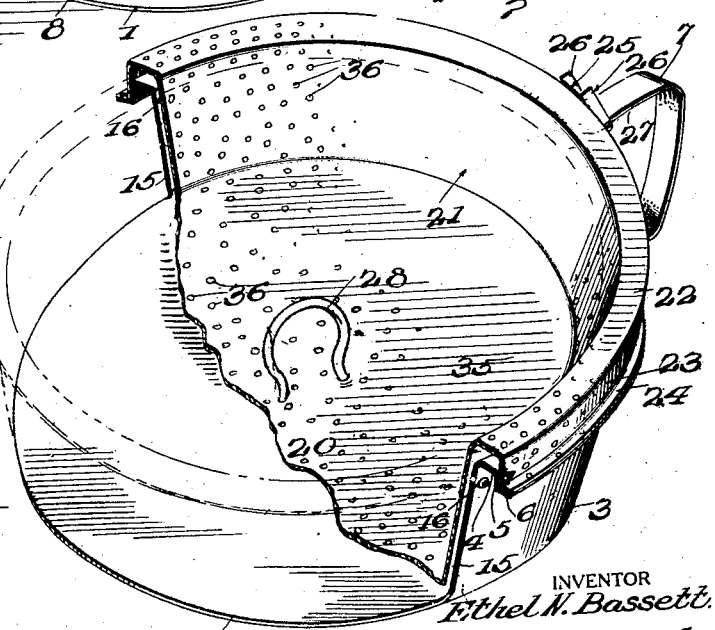
Fig. 4.
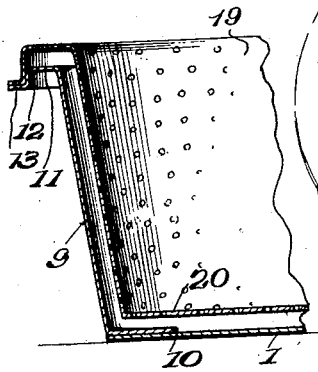
Fig. 3.
Fig. 2.
WITNESSES
W. A. Williams
Harry E. Seidel
INVENTOR
Ethel N. Bassett.
BY
ATTORNEYS Patented Aug. 17, 1926.

1,596,331

UNITED STATES PATENT OFFICE.

ETHEL NELL BASSETT, OF LINCOLN, NEBRASKA.

PIE TIN.

Application filed April 4, 1925. Serial No. 20,813.

This invention relates to tins for baking pies and has for its object the provision of a device formed of sections which may be readily separated so that the pie may be removed as a whole or in divided portions, without causing breakage of the pie crust or a disruption of the pie.

Another object of the invention is the provision of a tin for baking pie crust having a perforated removable cover for aiding in forming and maintaining the shape of the crust.

A further object of the invention is the provision of a tin for baking pies, said tin being formed of sections so constructed that they may be readily interfitted and locked together for baking purposes or easily disassociated for removing the baked pie as a whole or in divided portions.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:—

Figure 1 is a view in perspective of a baking tin properly assembled.

Figure 2 is a view in perspective of a section of the baking tin and perforated cover in assembled relation, with the cover broken away.

Figure 3 is a fragmentary vertical section of the combined cover and tin.

Figure 4 is a fragmentary view in perspective showing the construction of the joined sections of the tin.

Referring more particularly to the drawings, 1 designates a circular base member of a section 2 of the tin proper and which has a semi-circular upstanding flange 3 forming a support for the side walls of the pie crust. The periphery of the flange 3 is provided with an annular lateral flange 4 having a downwardly turned portion 5 and an outwardly turned portion 6. Connected to the side wall below the annular flange 6 is the inner end of a handle 7 which is bent outwardly and secured at its lower end to the lower edge of the wall 3.

A cooperating section, shown more particularly in Figures 1 and 3 is provided with a semi-circular side wall 9 and an internally projecting horizontally disposed semi-circular flange 10 which is received in overlapping relation by the free peripheral edge of base member, when the sections 2 and 8 are fitted together. The side wall 9 of the section 8 is also provided with a semi-annular lateral flange 11 which has a downwardly projecting portion 12 and a laterally extending portion 13. The edges of the wall 9, as shown at 14, are extended sufficiently and offset to be received in overlapping relation with the edges 15 of the wall 3 of the section 2. Adjacent these edges are provided pins or projections 16 adapted to engage notches 17 in the extensions 14 at the free ends of the wall 9 of the interfitting section 8. It will be noted that the section 8 is also provided with a handle 7ª which is secured at its upper end to a point adjacent the semi-annular lateral flange 13 and at its lower end to the lower portion of the wall 9 of said section.

A mold member is provided for the pan which is adapted to be employed in baking pie crusts for not only aiding in forming the crust but for retaining the crust in its proper shape when being baked. The mold member 19 has a circular base 20 adapted to be spaced from the base 1 and a circular wall 21 having a lateral annular flange 22 which is downturned at 23 and then outwardly at 24 with the flanges 23 and 24 cooperatively engaging the flanges 5 and 6, of section 2 and flanges 12 and 13 of the section 8 of the tin proper whereby the mold member is supported in spaced relation from the side walls of said sections and from the base 1 of said baking tin. Pivoted clamping members 25 are hinged at diametrically opposite points on the flange 24 of the mold member and are provided with resilient ears 26 engageable with the side edges 27 of the handles 7 and 7ª whereby the mold member is locked to the tin proper.

All portions of the cover are provided with perforations 36 at its base and side walls to permit the escape of steam therefrom and also to prevent the creation of a vacuum during baking.

It will be noted that a pie plate has been provided in which the dough may be placed and formed by means of the mold member 19 and maintained in position while being baked. The flanges 23 and 24 of said mold member cooperate with the complementary flanges of the sections 3 and 8 of the tin proper for forming the periphery of the crust and also for maintaining the same against breakage during baking. When the crust has been properly baked, the mold member may be removed by means of a handle 28 secured on the base member 20 of said mold member after the catches 25 have been released from the handle 7. The handle 28 is maintained in a vertical position so that the same may be readily grasped or engaged by some instrument for removing said mold member. The filling for the pie is then placed within the crust and the completion of the baking of the pie is had without the use of the mold member.

The catches 25 which are carried by the annular flange of the mold member 19 when engaging the handles 7 and 7a cooperate with the complementary flanges of the pan and the mold member to not only aid in retaining the mold member in place but for aiding in holding the sections of the pan in proper position.

What I claim is:—

1. A baking tin formed of two sections, one section having a circular base and a semi-circular side wall, the second section having a semi-circular side wall and an internal lateral flange adapted to engage the free periphery of the base member of the first section, cooperating means on the ends of the side walls of the sections adapted to lock the sections together, said locking means comprising extensions on the side walls of the second section adapted to overlap the ends of the side wall of the first section and provided with notches, and projections on the ends of the side wall of the first section engageable with said notches.

2. A baking tin formed of two sections, one section having a circular base and a semi-circular side wall, the second section having a semi-circular side wall and an internal lateral flange adapted to engage the free periphery of the base member of the first section, cooperating means on the ends of the side walls of the sections adapted to lock the sections together, a mold member adapted to be disposed within the interfitting sections, each of the sections of the tin proper being provided with a handle, a latching means pivoted to the mold member adapted to engage the handles for aiding in locking the sections of the baking tin together and for locking the mold member in position.

3. A baking tin formed of two sections, one section having a circular base and a semi-circular side wall, the second section having a semi-circular side wall and an internal lateral flange adapted to engage the free periphery of the base member of the first section, cooperating means on the ends of the side walls of the sections adapted to lock the sections together, a mold member adapted to be supported by the upper edge of the side walls of the sections of the baking tin, the mold member comprising a circular base and a circular side wall, the mold member being provided with extensions adapted to overlap the upper edge of the side wall of the baking tin, and latch means for locking the mold member to the sections and for aiding in locking the sections together.

4. A baking tin formed of two sections, one section having a circular base and a semi-circular side wall, the second section having a semi-circular side wall and an internal lateral flange adapted to engage the free periphery of the base member of the first section, cooperating means on the ends of the side walls of the sections adapted to lock the sections together, the side walls of each section being provided with external lateral extensions at their upper edges, with downwardly and outwardly projecting flanges disposed at the free edges of the lateral extensions.

5. A mold member for a baking tin having a perforated circular base, a perforated circular side wall and a circular horizontal flange projecting from the upper edge of the side wall with the flanges projecting downwardly and then outwardly from the first mentioned flange, and a handle projecting upwardly from the base of said cover.

ETHEL NELL BASSETT.